United States Patent [19]

Breckenridge

[11] 3,858,066

[45] Dec. 31, 1974

[54] NON-COMMUTATING SUPERCONDUCTING D. C. MACHINE

[75] Inventor: Robert G. Breckenridge, Northridge, Calif.

[73] Assignee: Rockwell International Corporation, El Segundo, Calif.

[22] Filed: Mar. 29, 1973

[21] Appl. No.: 346,221

[52] U.S. Cl. ............................................. 310/40
[51] Int. Cl. ................................................. H02k
[58] Field of Search ......... 310/54, 40, 10, 178, 156, 310/154, 68 D, DIG. 3; 318/138

[56] References Cited
UNITED STATES PATENTS

| | | | |
|---|---|---|---|
| 3,200,316 | 8/1965 | Engel | 310/178 |
| 3,293,457 | 12/1966 | Mori | 310/40 |
| 3,402,307 | 9/1968 | Pearl | 310/40 |
| 3,440,456 | 4/1969 | Grunwald | 310/40 |
| 3,441,755 | 4/1969 | Grunwald | 310/40 |
| 3,470,396 | 9/1969 | Kafka | 310/54 |
| 3,486,099 | 12/1969 | Brunner | 310/10 |
| 3,577,002 | 5/1971 | Hall | 310/68 D |
| 3,648,082 | 3/1972 | MacNab | 310/54 |

*Primary Examiner*—R. Skudy
*Attorney, Agent, or Firm*—L. Lee Humphries; Henry Kolin; Robert M. Sperry

[57] ABSTRACT

A direct current machine comprising a multipoled armature magnet mounted for rotation, a plurality of superconducting field magnets disposed in predetermined spaced relation about the path of rotation of said armature magnet, a timing system coupled for rotation with said armature magnet, a plurality of superconducting magnetic switches coupled to said timing system, a reversing circuit means including said magnetic switches for periodically reversing the magnetic field between said armature magnet and said field magnets.

6 Claims, 9 Drawing Figures

PATENTED DEC 31 1974 3,858,066

NON-COMMUTATING SUPERCONDUCTING D. C. MACHINE

BACKGROUND OF THE INVENTION

1. Field of the Invention

This invention relates to electric machines and is particularly directed to non-commutating, superconducting direct current motors or generators.

2. Prior Art

Direct current motors have several advantages, particularly in regard to starting torque and speed control, so that they are widely used even though direct current is not a popular form of power. The chief disadvantage of a direct current motor of the usual type is the requirement for commutating the armature current. This has tended to limit the performance of the motors and rather elaborate secondary field windings have been developed to repress arcing, etc., and to improve the commutation performance. In the conventional direct current motor, the major power requirement is for the armature which rotates and only a small amount of power is used to produce a relatively weak magnetic field in the stator.

With the development of high field superconductors, it became possible to consider alternative approaches in which the stator could play an important role. As a result, a design was developed, based on the old Faraday homopolar motor idea. In this design, the superconducting stator provided an intense magnetic field which interacted with a current flowing at right angles to the field in the rotor to produce the torque. In a large motor, these currents are also very large, approaching 6,000 amps in a 3,250 hp motor built recently. Moreover, although the homopolar motor does not require commutation, it requires very special brushes to handle these currents at fairly high sliding speeds and considerable development effort has been devoted to these brushes, but these brushes still constitute a major problem.

BRIEF SUMMARY AND OBJECTS OF THE INVENTION

These disadvantages of the prior art are overcome with the present invention and a direct current machine is provided which retains the better features of multipole machines, but does not require commutation. It will be understood that the machine may operate as a motor or as a generator of electrical current, possibly with minor modification to improve performance in a particular function. In the following discussion, for simplicity, the machine will be described as a motor.

The advantages of the present invention are preferably attained by providing a direct current motor comprising a multipoled armature magnet mounted for rotation, a plurality of superconducting field magnets disposed in predetermined spaced relation about the path of rotation of said armature magnet, a timing system coupled for rotation with said armature magnet, a plurality of superconducting magnetic switches coupled with the rotation of said time system, and reversing circuit means including said magnetic switches for periodically reversing the magnetic field between said armature magnet and said field magnets.

Accordingly, it is an object of the present invention to provide improved direct current motors.

Another object of the present invention is to provide a direct current motor which does not require commutation.

A specific object of the present invention is to provide a direct current motor comprising a multipoled armature magnet mounted for rotation, a plurality of superconducting field magnets disposed in predetermined, spaced relation about the path of rotation of said armature magnet, a timing system coupled for rotation with said armature magnet, a plurality of superconducting magnetic switches coupled with the rotation of said timing system, and reversing circuit means including said magnetic switches for periodically reversing the magnetic field between said armature magnet and said field magnets.

These and other objects and features of the present invention will be apparent from the following detailed description, taken with reference to the accompanying drawing.

DETAILED DESCRIPTION OF INVENTION

Figure 1:
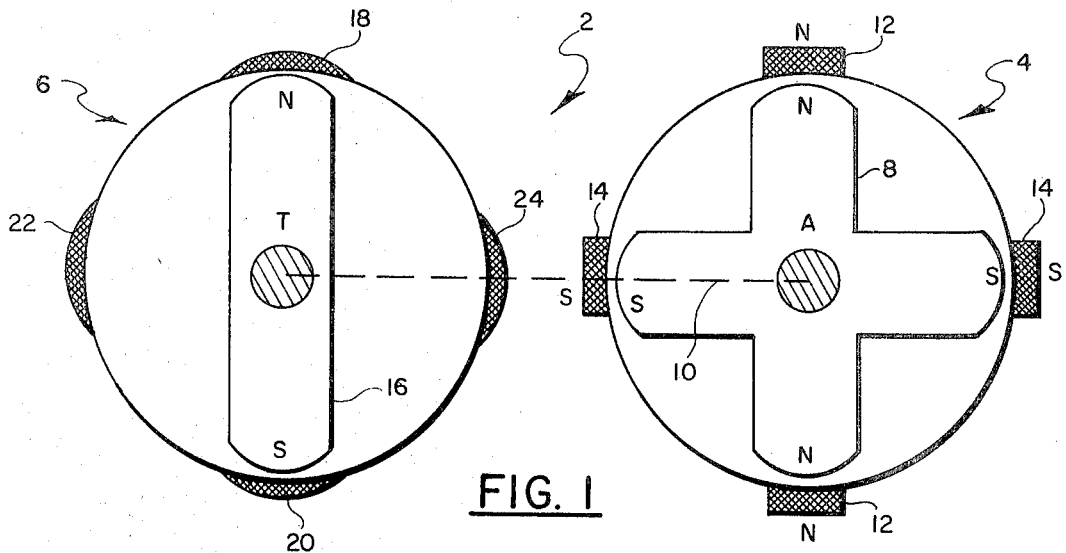
FIG. 1 is a diagrammatic representation of a direct current motor embodying the present invention.

In that form of the present invention chosen for purposes of illustration, in FIG. 1, a direct current motor, indicated generally at 2, is shown comprising a driving unit 4 and a timing unit 6. The driving unit 4 comprises a multipole permanent magnet armature 8 which is rotatably mounted, as by shaft 10, and a plurality of stator windings 12 and 14 disposed about the path of rotation of the armature 8. As shown, the armature 8 is a four-pole magnet. However, it will be apparent that any even multiple of poles may be provided. The stator windings 12 and 14 are preferably formed of a composite conductor containing as its active component a "hard" or Type II superconducting material, such as an alloy which might typically consist of about 40 percent by weight of niobium and about 60 percent by weight of titanium but which might contain other elements or a niobium-tin compound, $Nb_3Sn$, which will accommodate a high magnetic field. The timing unit 6 comprises a timing magnet 16 which in this illustration is a permanent magnet coupled for rotation with the armature 8, as by mounting on the shaft 10. A plurality of magnetic field windings 18, 20, 22 and 24 are disposed about the path of rotation of the timing magnet 16 and are preferably formed of a "soft" or Type I superconducting material, such an unalloyed niobium, such that the windings 18, 20, 22 and 24 are driven to a "normal" or relatively nonconducting state as the poles of the timing magnet 16 come into proximity with the respective windings 18, 20, 22 and 24.

Figure 2:
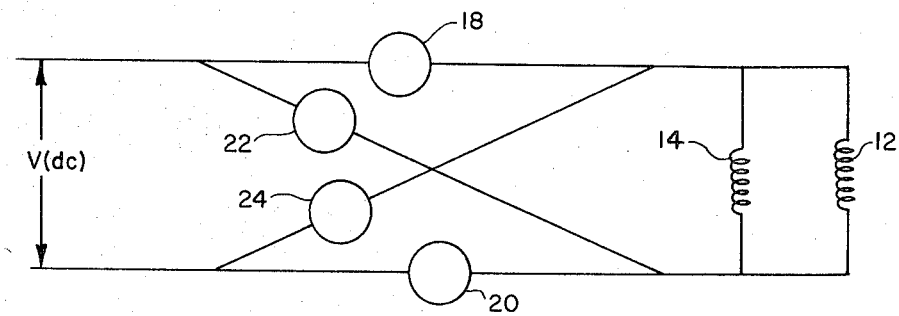
FIG. 2 is a circuit diagram of the timing circuit for the motor of FIG. 1.

FIG. 2 illustrates the electrical circuit connecting the components of the motor 2 of FIG. 1 and it will be seen that the timing unit 6 effectively constitutes a superconducting switching system. In use, with the timing magnet 16 in the position shown in FIG. 1, the magnetic field of the timing magnet 16 serves to drive the field windings 18 and 20 to a normal, relatively nonconducting state. Thus, practically all of the supplied current flows through windings 22 and 24 to produce a magnetic field in stator windings 12 and 14 which will repel the adjacent poles of the armature 8 and will cause the armature 8 to rotate ninety degrees. However, since the timing magnet 16 is coupled for rotation with the armature 8, the rotation of the armature 8 also causes the timing magnet 16 to rotate ninety degrees. When this occurs, the magnetic field of the timing magnet 16 serves to drive the windings 22 and 24 into a normal relatively nonconducting state, whereas the windings 18 and 20 regain their superconductivity and serve to reverse the current through the stator windings 12 and 14, thereby reversing the magnetic field of the stator windings 12 and 14 and serving to rotate the armature 8 and timing magnet 16 through an additional ninety degrees. If desired even in this illustration, other magnetic sensors, such as Hall effect sensors may be substituted for the field windings 18, 20, 22 and 24 to sense the position of the timing magnet 16 and to control switching of the current to the stator windings 12 and 14. In practice, the Hall effect probes or other electronic or optical systems capable of rapid response, coupled with rapid response electronic systems to control the superconducting switches would be desirable.

For illustration, the armature 8 has been described above as being a permanent magnet. However, in practice, an electromagnet may be employed for the armature 8 and will require a relatively small energizing current, which can easily be suppled through slip rings using conventional techniques, without encountering the problems of the prior art which arose from attempting to supply large currents to the armature.

Figure 3:
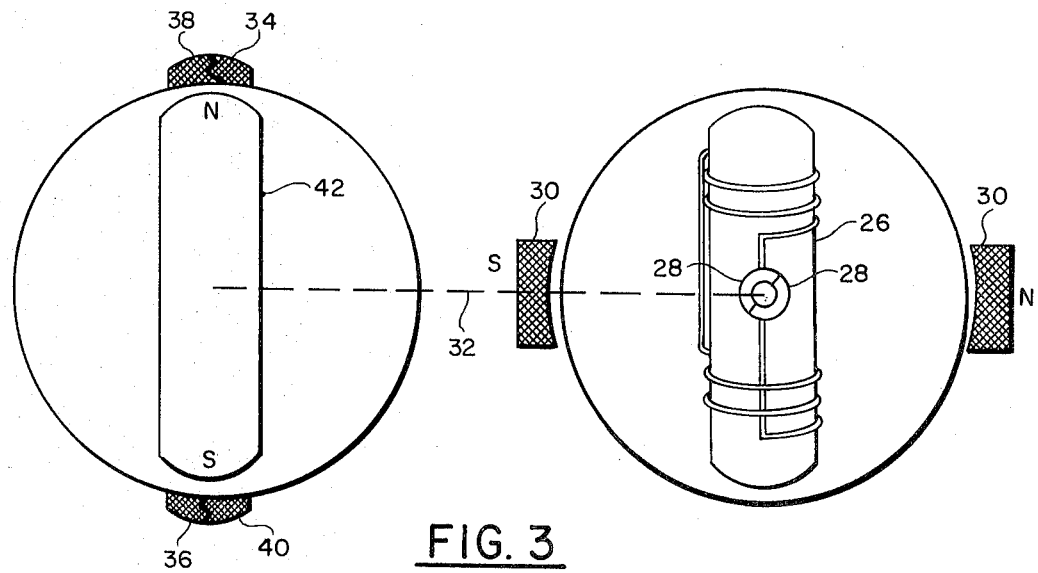
FIG. 3 is a diagrammatic representation of an alternative form of the motor of FIG. 1.
Figure 4:
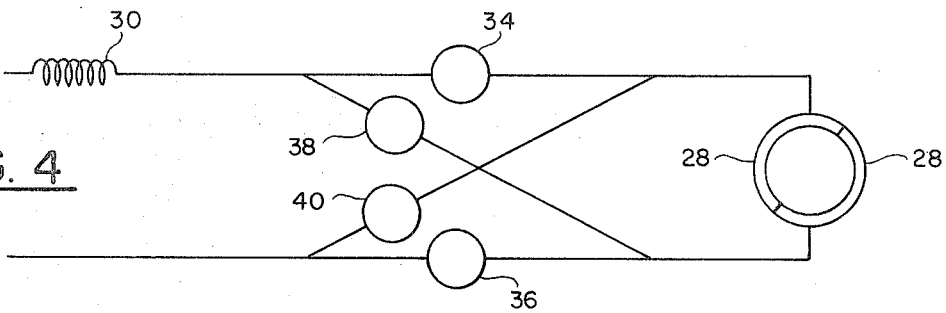
FIG. 4 is a plan view of the timing unit of the motor of FIG. 3.
Figure 5:
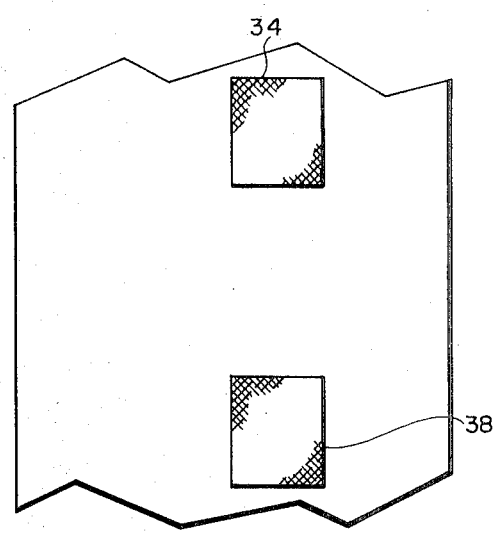
FIG. 5 is a circuit diagram of the timing circuit for the motor of FIG. 3.
Figure 6A:
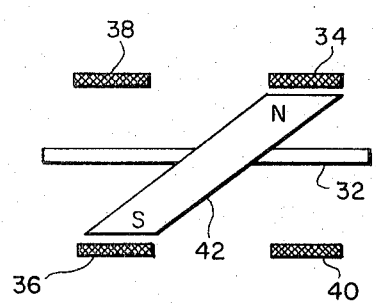
FIGS. 6a, 6b, 7a, and 7b are diagrammatic representations showing details of the timing circuit of FIG. 5.

FIGS. 3–7 illustrate an alternative form of the motor of FIG. 1. In this form, the armature 26 must be an electromagnet in order to allow polarity reversal and is energized through slip rings 28. The stator windings 30 are preferably direct current energized "hard" or Type II superconductors possibly operating in the persistent mode in which the magnet can be removed from the active electrical circuit. Permanent magnets may be employed to provide the stator field but, obviously, the much higher magnetic fields available with superconductors is desirable. As in the motor of FIG. 1, the armature 26 is mounted for rotation, as by shaft 32, and the stator windings 30 are disposed about the path of rotation of the armature 26. The field windings 34, 36, 38 and 40 are formed of "soft" or Type I superconducting material and are arranged in laterally displaced pairs of opposingly polarized windings, as seen in FIGS. 3 and 5, disposed 180° apart about the path of orientation of the timing magnet 42. The timing magnet 42 is a permanent magnet and is mounted on the shaft 32 for rotation with the armature 26 in an inclined manner, as best seen in FIGS. 6a and 6b.

Figure 7A:
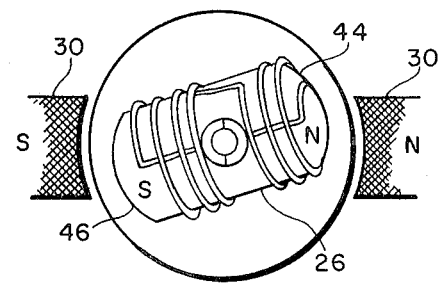
Figure 6B:
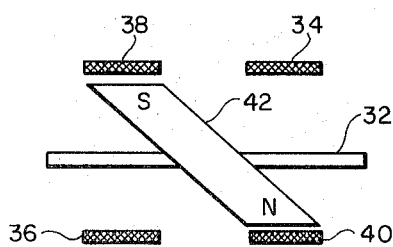
Figure 7B:
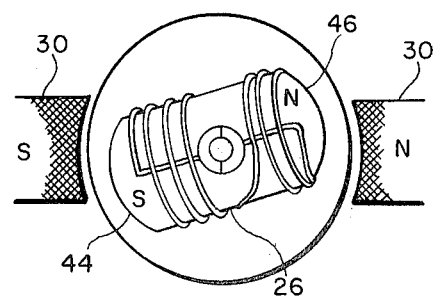

FIG. 4 is an electrical circuit diagram for the motor of FIG. 3 and, as shown, the field windings 34, 36, 38 and 40 control the polarity of the current supplied through slip rings 28 to energize the armature 26. When the timing system 42 is in the position shown in FIG. 5a, field windings 34 and 36 are driven "normal" and the primary current flows through field windings 38 and 40 in the sense to make pole 44 of armature 26 have a North polarity and to make pole 46 of armature 26 have a South polarity, as seen in FIG. 7a. These fields repel the fields of the stator windings 30 and serve to rotate the armature 26 and, hence, the timing magnet 42 through 180° to the position seen in FIG. 6b. In this position, the magnetic field of the timing system 42 serves to drive field windings 38 and 40 "normal," while current is allowed to flow readily through field windings 34 and 36 in the sense to make pole 44 of armature 26 have a South polarity and to make pole 46 of armature 26 have a North polarity, as seen in FIG. 7b.

With the arrangement of FIG. 3, the windings of armature 26 may be either series, shunt or compound windings, as desired, and with a high field provided by the stator 30, the current required for armature 26 will be low. Moreover, it should be understood that other magnetic sensors, such as Hall effect sensors, could be substituted for the field windings of the timing unit.

Obviously, numerous other variations and modifications may be made without departing from the present invention. Accordingly, it should be clearly understood that the forms of the present invention described above and shown in the accompanying drawing are illustrative only and are not intended to limit the scope of the present invention.

What is claimed is:

1. A direct current machine comprising:
   a multipoled, non-superconducting armature magnet,
   a plurality of superconducting stator magnets disposed in predetermined spaced relation about the path of rotation of said armature magnet, said stator magnets being formed of hard, Type II superconductive material,
   a timing magnet coupled for rotation with said armature magnet,
   a plurality of magnetic switch means disposed in predetermined spaced relation about the path of rotation of said timing magnet and actuatable by said timing magnet,
   said magnetic switch means comprising field windings formed of soft, Type I superconductive material, the magnetic field of said timing magnet being of sufficient strength so as to cause the soft superconductive material of a field winding to revert to the normal resistance state each time a pole of said timing magnet passes that field winding, and
   a reversing circuit including said magnetic switch means for periodically reversing the polarity of the magnetic field between said armature magnet and said stator magnets.

2. The device of claim 1 wherein said armature is a permanent magnet.

3. The device of claim 1 wherein said reversing circuit serves to reverse the polarity of said stator magnets so as to create a rotational torque on said armature magnet.

4. The device of claim 1 wherein said armature magnet is an electromagnet, and wherein said reversing circuit serves to reverse the polarity of said armature.

5. The device of claim 3 wherein said reversing circuit comprises:
   a first pair of field windings arranged simultaneously to be switched to the normal state when the timing magnet is in a first orientation and connected to conduct current in one direction to said stator magnets when in the superconducting state, and a second pair of field windings arranged simultaneously to be switched to the normal state when the timing magnet is in a second orientation and connected to conduct current in the opposite direction to said stator magnets when in the superconducting state.

6. A direct current machine comprising;

a multipoled armature magnet having a relatively low strength magnetic field, a plurality of stator magnets disposed in predetermined spaced relation about the path of rotation of said armature, each of said stator magnets having a relatively high strength magnetic field and being formed of a hard, Type II superconductive material, a timing magnet coupled for rotation with said armature magnet, a plurality of magnetic field windings disposed in predetermined spaced relation about the path of rotation of said timing magnet, said field windings being formed of a soft, Type I superconductive material, the magnetic field of said timing magnet being of sufficient strength so as to cause the soft superconductive material of each field winding to revert to the normal resistance state when a pole of said timing magnet rotates past that field winding, and a reversing circuit including said magnetic field windings for periodically reversing the polarity of the magnetic field between said armature magnet and said stator magnets.

* * * * *